(12) United States Patent
Miyoshi et al.

(10) Patent No.: US 12,084,842 B2
(45) Date of Patent: Sep. 10, 2024

(54) EVALUATION SYSTEM FOR WORK MACHINE AND EVALUATION METHOD FOR WORK MACHINE

(71) Applicant: KOMATSU LTD., Tokyo (JP)

(72) Inventors: Tatsuro Miyoshi, Tokyo (JP); Tsuyoshi Kobayashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 286 days.

(21) Appl. No.: 17/622,332

(22) PCT Filed: Jul. 8, 2020

(86) PCT No.: PCT/JP2020/026672
§ 371 (c)(1),
(2) Date: Dec. 23, 2021

(87) PCT Pub. No.: WO2021/010248
PCT Pub. Date: Jan. 21, 2021

(65) Prior Publication Data
US 2022/0251808 A1    Aug. 11, 2022

(30) Foreign Application Priority Data

Jul. 12, 2019    (JP) ................... 2019-130552

(51) Int. Cl.
*E02F 9/26*    (2006.01)
*G01L 5/12*    (2006.01)
*G05B 23/02*    (2006.01)

(52) U.S. Cl.
CPC ............... *E02F 9/267* (2013.01); *G01L 5/12* (2013.01); *G05B 23/0283* (2013.01)

(58) Field of Classification Search
CPC ................................. E02F 9/267; G01L 5/12
USPC ........................................................ 701/50
See application file for complete search history.

(56) References Cited

U.S. PATENT DOCUMENTS

| | | | |
|---|---|---|---|
| 6,181,999 B1 * | 1/2001 | Yamamoto | E02F 3/844 |
| | | | 701/50 |
| 6,371,214 B1 * | 4/2002 | Anwar | E02F 3/434 |
| | | | 701/50 |
| 6,611,746 B1 | 8/2003 | Nagai | |
| 7,953,559 B2 * | 5/2011 | Sundermeyer | G01N 3/32 |
| | | | 702/41 |

(Continued)

FOREIGN PATENT DOCUMENTS

| | | |
|---|---|---|
| CN | 106680001 A | 5/2017 |
| CN | 109406178 A | 3/2019 |

(Continued)

OTHER PUBLICATIONS

Geng et al., "Fatigue Life Analysis and Structure Performance Improvement of Bulldozer Working Device Based on ANSYS," 2017, Publisher: IEEE.*

*Primary Examiner* — Tuan C To
(74) *Attorney, Agent, or Firm* — Faegre Drinker Biddle & Reath LLP

(57) ABSTRACT

An evaluation system for a work machine includes a work implement, a support unit for the work implement, a cylinder that causes the work implement to move with respect to the support unit, and an evaluation unit that evaluates a degree of fatigue of the support unit based on an axial force of the cylinder.

6 Claims, 8 Drawing Sheets

(56) References Cited

U.S. PATENT DOCUMENTS

| | | | | |
|---|---|---|---|---|
| 2006/0243055 | A1* | 11/2006 | Sundermeyer | G01N 3/32 |
| | | | | 73/760 |
| 2006/0243056 | A1* | 11/2006 | Sundermeyer | G01N 3/32 |
| | | | | 73/760 |
| 2006/0243180 | A1* | 11/2006 | Sundermeyer | G06F 11/2263 |
| | | | | 714/E11.158 |
| 2010/0100338 | A1* | 4/2010 | Vik | G01M 5/0033 |
| | | | | 702/42 |
| 2014/0244101 | A1 | 8/2014 | Chitty et al. | |
| 2020/0190767 | A1 | 6/2020 | Aoyama et al. | |
| 2020/0263383 | A1* | 8/2020 | Kerestes | E02F 3/38 |
| 2021/0054596 | A1* | 2/2021 | Rohland | B60S 9/12 |

FOREIGN PATENT DOCUMENTS

| | | | | |
|---|---|---|---|---|
| EP | 3421672 A1 * | 1/2019 | | E02F 9/006 |
| JP | H05-202535 A | 8/1993 | | |
| JP | 2001-261297 A | 9/2001 | | |
| JP | 2003-166909 A | 6/2003 | | |
| JP | 2005-163470 A | 6/2005 | | |
| JP | 2007-163384 A | 6/2007 | | |
| JP | 2012-007387 A | 1/2012 | | |
| JP | 2014-085293 A | 5/2014 | | |
| JP | 2014-163047 A | 9/2014 | | |
| JP | 2015-190114 A | 11/2015 | | |
| JP | 2015-229891 A | 12/2015 | | |
| JP | 2016-105213 A | 6/2016 | | |
| JP | 2018-178442 A | 11/2018 | | |
| JP | 2019-060091 A | 4/2019 | | |
| WO | WO-2014/141855 A1 | 9/2014 | | |

* cited by examiner (A)

(B)

EVALUATION SYSTEM FOR WORK MACHINE AND EVALUATION METHOD FOR WORK MACHINE

TECHNICAL FIELD

The present disclosure relates to evaluation of the degree of fatigue of a work machine.

BACKGROUND ART

It is known that conventionally earthmoving machines such as hydraulic excavator repeatedly work under a high load in a work site where the ground is unleveled and considerably rough, and therefore undergo large vibrations during both working and travelling. In particular, main structures such as swing frame are repeatedly loaded by a high load, due to vibrations of machines such as engine mounted on the swing frame and/or structures such as counterweight and tank (on-board weight components) mounted thereon, resulting in a shortened fatigue life in some cases.

For the main structures of the earthmoving machines, it is therefore necessary to appropriately recognize and evaluate their fatigue life and carry out maintenance such as preliminary repair. Japanese Patent Laying-Open No. 2007-163384 proposes a method for estimating the fatigue life of a structure by: providing an acceleration sensor on an on-board weight component which is a constituent element of a vehicle body; detecting a predominant frequency and a maximum acceleration range per day based on acceleration data; estimating a frequency distribution of a stress range based on the predominant frequency and the maximum acceleration range per day; and evaluating fatigue damages of a part of a vehicle frame on which the on-board weight component is mounted, based on the estimated frequency distribution of the stress range.

CITATION LIST

Patent Literature

PTL 1: Japanese Patent Laying-Open No. 2007-163384

SUMMARY OF INVENTION

Technical Problem

Meanwhile, the frame of the hydraulic excavator has a high stiffness, and therefore, deformation itself of the frame due to vibrations is small, which makes it difficult to measure the acceleration with high precision.

An object of the present disclosure is to provide an evaluation system for a work machine and an evaluation method for a work machine that enable the degree of fatigue to be evaluated with high precision in a simple way.

Solution to Problem

In the present disclosure, an evaluation system for a work machine includes: a work implement; a support unit for the work implement; a cylinder that causes the work implement to move with respect to the support unit; and an evaluation unit that evaluates a degree of fatigue of the support unit based on an axial force of the cylinder.

In the present disclosure, an evaluation method for a work machine is an evaluation method for a work machine that includes: a support unit for a work implement; an operational unit for the work implement that is supported operatively by the support unit; and a cylinder that causes the operational unit to move with respect to the support unit, and the evaluation method includes: calculating an axial force of the cylinder; and evaluating a degree of fatigue of the support unit based on the calculated axial force of the cylinder.

Advantageous Effects of Invention

The evaluation system for a work machine and the evaluation method for a work machine in the present disclosure enable the degree of fatigue to be evaluated with high precision in a simple way.

DESCRIPTION OF EMBODIMENTS

Figure 1:
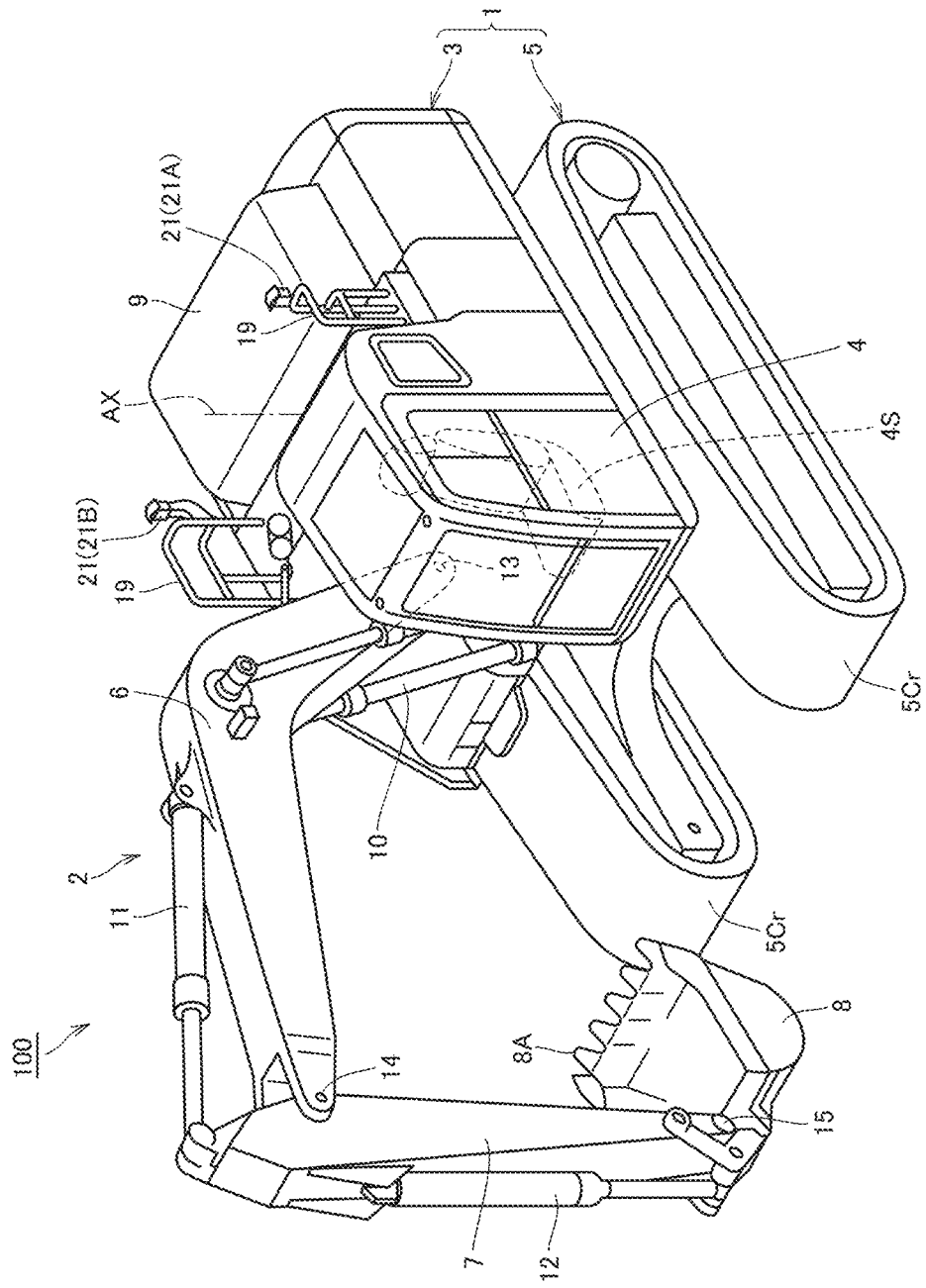
FIG. 1 is an external view of a work machine according to an embodiment.

Embodiments are described hereinafter with reference to the drawings. In the following description, the same components are denoted by the same reference characters. They are named identically and function identically. A detailed description thereof is therefore not repeated herein.

<Overall Configuration of Work Machine>

FIG. 1 is an external view of a work machine according to an embodiment.

As shown in FIG. 1, a hydraulic excavator including a work implement 2 that is hydraulically actuated is described as an example of a work machine to which the concept of the present disclosure is applicable.

A work machine 100 includes a vehicle body 1 and work implement 2.

Vehicle body 1 includes a swing body 3, an operator's cab 4, and a travel implement 5.

Swing body 3 is disposed on travel implement 5. Travel implement 5 supports swing body 3. Swing body 3 is capable of swinging about a swing axis AX. In operator's cab 4, an operator's seat 4S is provided on which an operator is to sit. The operator in operator's cab 4 manipulates work machine 100. Travel implement 5 includes a pair of crawler belts 5Cr. Crawler belts 5Cr are rotated to cause work machine 100 to travel. Travel implement 5 may be implemented by wheels (tires).

The positional relation between components relative to an operator sitting on operator's seat 4S is described. Front-to-rear direction refers to the front-to-rear direction relative to the operator sitting on operator's seat 4S. Left-to-right direction refers to the left-to-right direction relative to the operator sitting on operator's seat 4S. The left-to-right direction is identical to the width direction of the vehicle (vehicle width direction). Frontward direction refers to the direction in which the operator sitting on operator's seat 4S faces forward. Rearward direction is the direction opposite to the frontward direction. The right side and the left side of the operator sitting on operator's seat 4S who faces forward are rightward direction and leftward direction, respectively.

Swing body 3 includes an engine compartment 9 in which an engine is housed and a counterweight disposed in a rear part of swing body 3. On swing body 3, a handrail 19 is placed forward of engine compartment 9. In engine compartment 9, components such as engine and hydraulic pump are disposed.

Work implement 2 is supported by swing body 3. Work implement 2 includes a boom 6, an arm 7, a bucket 8, a boom cylinder 10, an arm cylinder 11, and a bucket cylinder 12.

Boom 6 is connected to swing body 3 through a boom pin 13. Arm 7 is connected to boom 6 through an arm pin 14. Bucket 8 is connected to arm 7 through bucket pin 15. Boom cylinder 10 drives boom 6. Arm cylinder 11 drives arm 7. Bucket cylinder 12 drives bucket 8. The base end (boom foot) of boom 6 is connected to swing body 3. The head end (boom top) of boom 6 is connected to the base end (arm foot) of arm 7. The head end (arm top) of arm 7 is connected to the base end of bucket 8. Boom cylinder 10, arm cylinder 11, and bucket cylinder 12 are each a hydraulic cylinder driven by hydraulic oil.

Boom 6 is pivotable about boom pin 13 serving as a pivot shaft, with respect to swing body 3. Arm 7 is pivotable about arm pin 14 serving as a pivot shaft and being parallel to boom pin 13, with respect to boom 6. Bucket 8 is pivotable about bucket pin 15 serving as a pivot shaft and being parallel to both boom pin 13 and arm pin 14, with respect to arm 7.

It should be noted that boom 6 and work implement 2 are examples of "operational unit" and "work implement," respectively, of the present disclosure.

Figure 2:
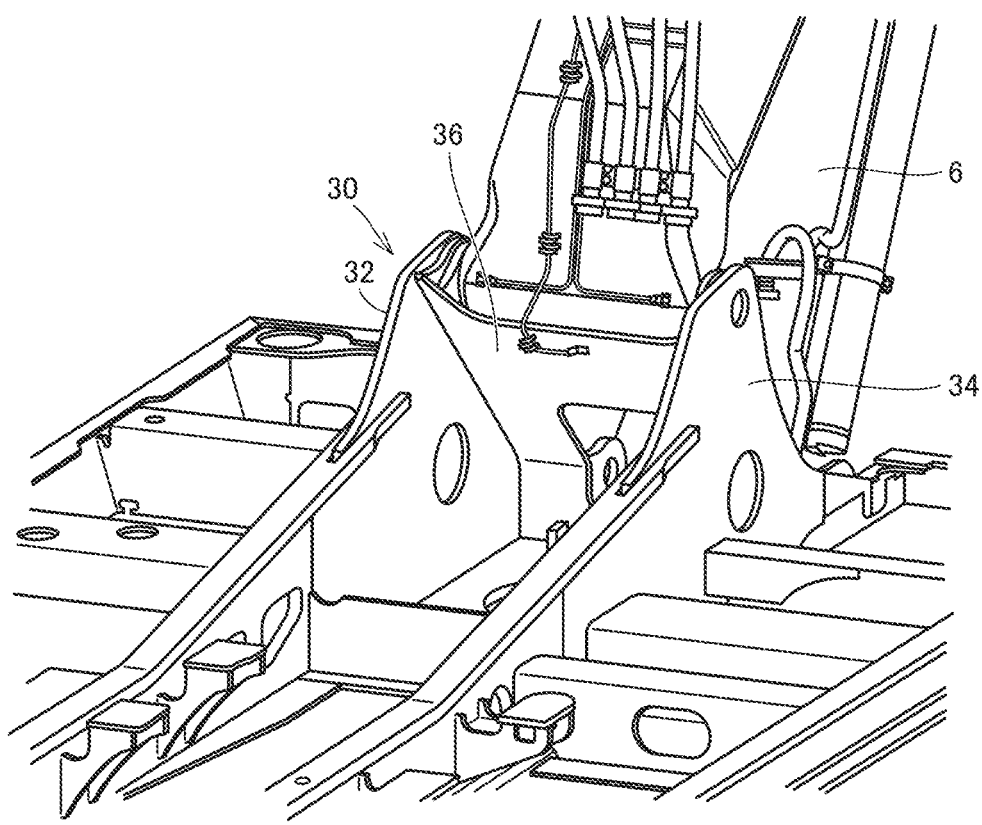
FIG. 2 illustrates a structure of a swing frame 30 of a swing body 3 according to an embodiment.

FIG. 2 illustrates a structure of a swing frame 30 of swing body 3 according to an embodiment.

As shown in FIG. 2, the base end (boom foot) of boom 6 is coupled to swing frame 30 of swing body 3.

Swing frame 30 includes a pair of longitudinal plates 32, 34 and a bridge plate 36 spanning between longitudinal plates 32, 34. Longitudinal plates 32, 34 hold the base end (boom foot) of boom 6 therebetween to support boom 6. Longitudinal plates 32, 34 and bridge plate 36 are welded together.

The joint between the base end (boom foot) of boom 6 and swing frame 30 is repeatedly loaded by a high load. Due to the high load, local fatigue fracture may occur to the weld between longitudinal plates 32, 34 and bridge plate 36 that is a part of the joint between the base end (boom foot) of boom 6 and swing frame 30. The present embodiment is therefore described in connection with a method for evaluating the degree of fatigue of swing frame 30.

Swing frame 30 is an example of "support unit" of the present disclosure.

Figure 3:
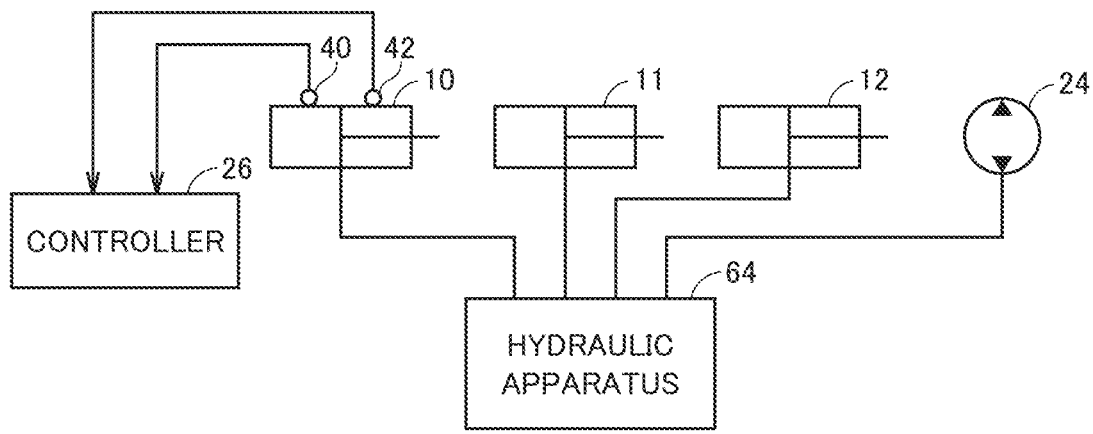
FIG. 3 illustrates a configuration of a control system for a work machine 100 according to an embodiment.

FIG. 3 illustrates a configuration of a control system for work machine 100 according to an embodiment.

As shown in FIG. 3, work machine 100 includes a controller 26, boom cylinder 10, arm cylinder 11, bucket cylinder 12, a swing motor 24, and a hydraulic apparatus 64.

Hydraulic apparatus 64 includes a hydraulic oil tank, a hydraulic pump, a flow rate control valve, and an electro-magnet proportional control valve, which are not shown. The hydraulic pump is driven by power of the engine (not shown) to supply hydraulic oil through the flow rate control valve to boom cylinder 10, arm cylinder 11, and bucket cylinder 12. The hydraulic pump supplies hydraulic oil to swing motor 24 so as to cause swing body 3 to swing.

Boom cylinder 10 is provided with a bottom pressure detection sensor 40 and a head pressure detection sensor 42. Bottom pressure detection sensor 40 detects the bottom pressure of boom cylinder 10 and outputs the result of the detection to controller 26. Head pressure detection sensor 42 detects the head pressure of boom cylinder 10 and outputs the result of the detection to controller 26.

Based on the bottom pressure and the head pressure, controller 26 calculates the axial force of boom cylinder 10.

<Configuration of Controller 26>

Figure 4:
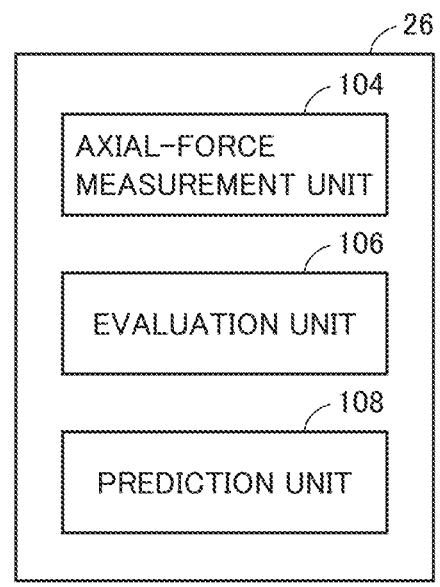
FIG. 4 is a block diagram showing a configuration of a controller 26 according to an embodiment.

FIG. 4 is a block diagram showing a configuration of controller 26 according to an embodiment.

As shown in FIG. 4, controller 26 includes an axial-force measurement unit 104, an evaluation unit 106, and a prediction unit 108.

Axial-force measurement unit 104 measures the axial force of boom cylinder 10.

Specifically, axial force F of boom cylinder 10 can be calculated based on the following expression.

$$\text{Axial Force } F[\text{kn}] = Pb \ [\text{mpa}] \times Sb \ [\text{mm}^2] - Ph \ [\text{mpa}] \times Sh \ [\text{mm}^2]$$

Pb is the bottom pressure of boom cylinder 10. Ph is the head pressure of boom cylinder 10. Sb is the bottom area of boom cylinder 10. Sh is the head area of boom cylinder 10. Axial-force measurement unit 104 acquires, in advance, the value of the bottom area and the value of the head area of boom cylinder 10.

Based on the axial force of boom cylinder 10, evaluation unit 106 evaluates the degree of fatigue of swing frame 30 supporting boom cylinder 10.

Prediction unit 108 predicts the lifetime based on the result of the evaluation by evaluation unit 106.

Figure 5:
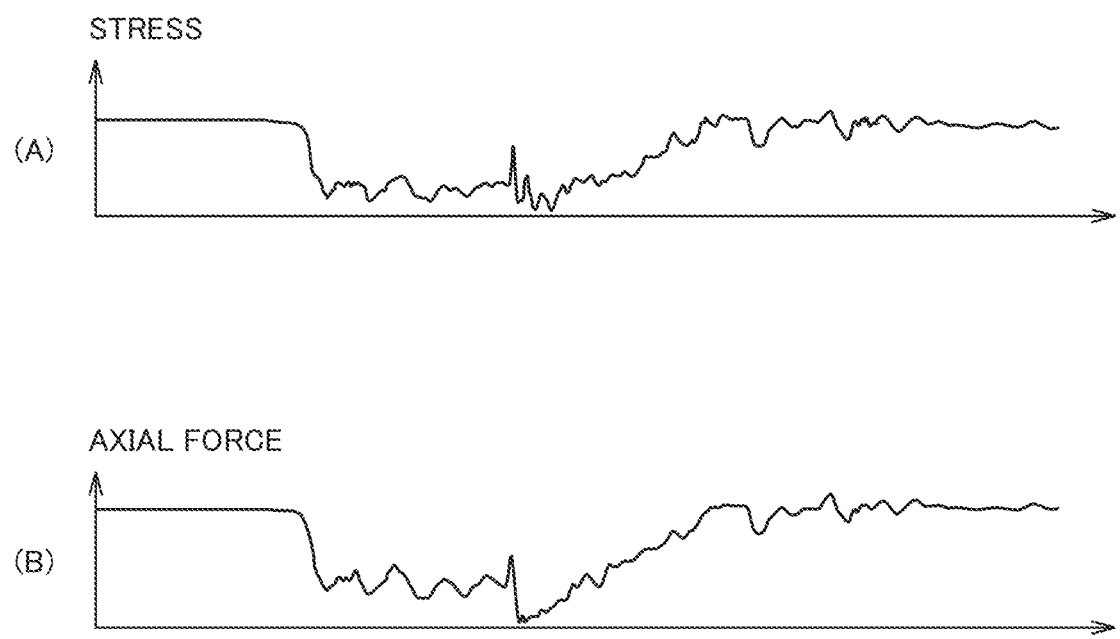
FIG. 5 illustrates the stress on and the axial force of swing frame 30 supporting a boom cylinder 10 of work machine 100 according to an embodiment.

FIG. 5 illustrates the stress on and the axial force of swing frame 30 supporting boom cylinder 10 of work machine 100 according to an embodiment.

FIG. 5 (A) shows a stress waveform of the stress exerted on swing frame 30 for a predetermined period, and measured by means of a stress sensor bonded to swing frame 30.

FIG. 5 (B) shows an axial-force waveform of the axial force of boom cylinder 10 measured by means of bottom pressure detection sensor 40 and head pressure detection sensor 42.

Figure 6:
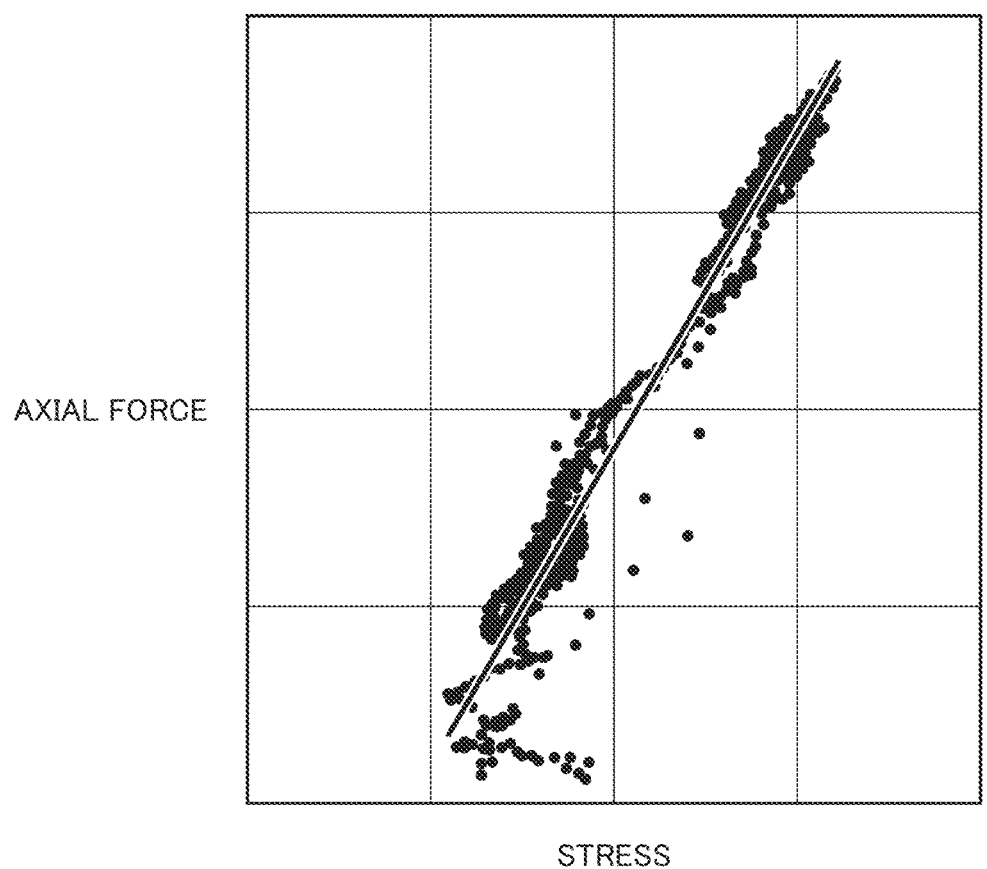
FIG. 6 illustrates a relation between the stress and the axial force according to an embodiment.

FIG. 6 illustrates a relation between the stress and the axial force according to an embodiment.

As shown in FIG. 6, a regression line determined by the method of least squares is plotted, and it is seen that the coefficient of correlation between the stress and the axial force is significantly large. Therefore, the stress on swing frame 30 can be estimated from the axial force, rather than directly measuring the stress.

Figure 7:
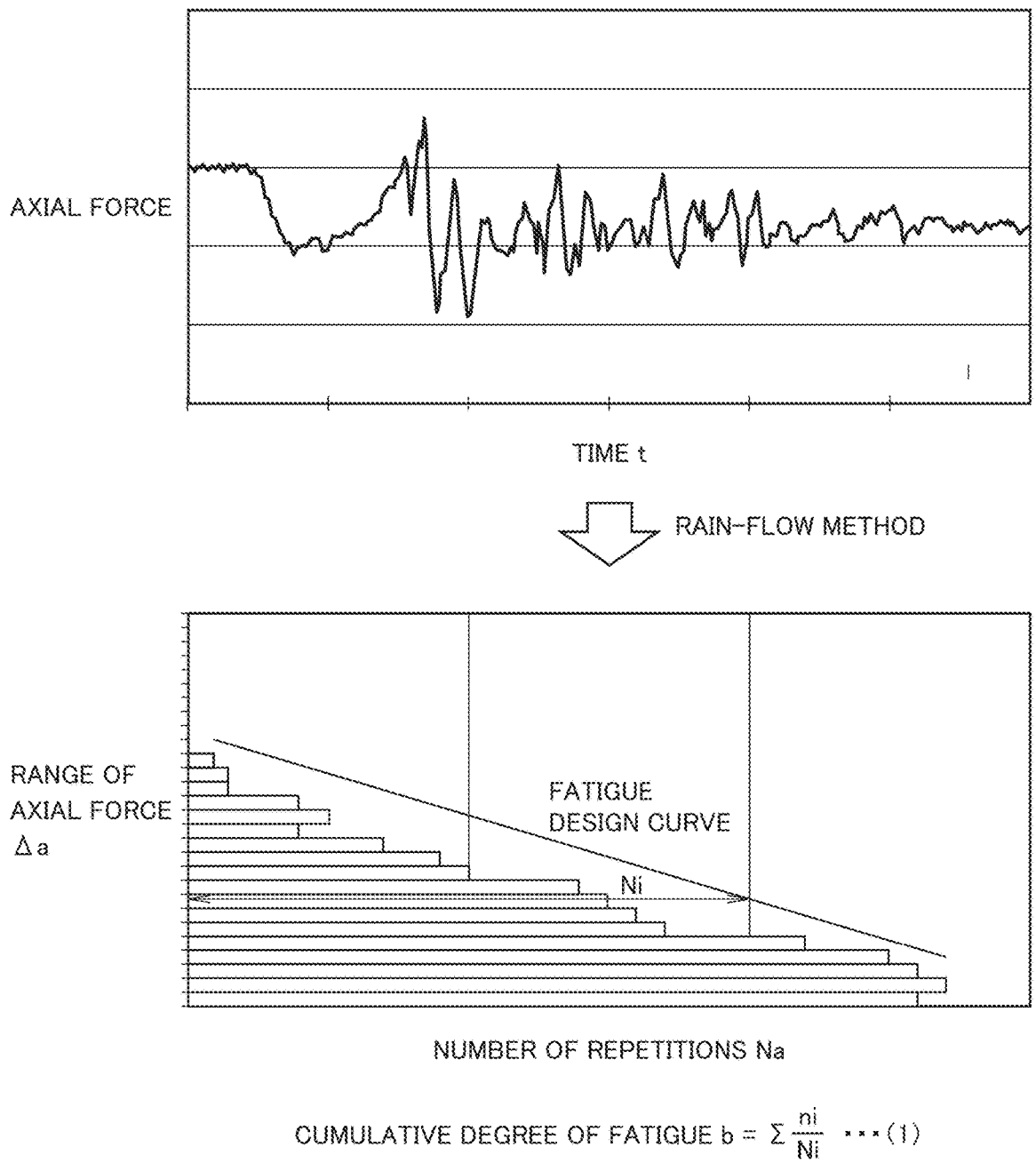
FIG. 7 illustrates processing performed by an evaluation unit 106 according to an embodiment.

FIG. 7 illustrates processing performed by evaluation unit 106 according to an embodiment.

As shown in FIG. 7, evaluation unit 106 calculates the frequency of the axial force using the rain-flow method, and evaluates the degree of fatigue based on the result of the calculation. The stress frequency to be used for calculating the degree of fatigue of swing frame 30 is thus estimated from the frequency of the axial force.

Specifically, the axial-force frequency is calculated from the axial-force waveform shown in FIG. 5, using the known rain-flow method.

The rain-flow method is used to calculate the number of repetitions Na for each axial-force range Aa and convert the number of repetitions to the axial-force frequency.

Evaluation unit 106 calculates the degree of fatigue based on the axial-force frequency obtained by the rain-flow method.

Specifically, the fatigue design curve and Expression (1) as shown in FIG. 7 are used to calculate the cumulative degree of fatigue D.

A method according to an embodiment calculates the degree of fatigue using the axial force of boom cylinder 10, without using the stress measured with the stress sensor. The degree of fatigue can accordingly be evaluated with high precision by the simple method.

Figure 8:
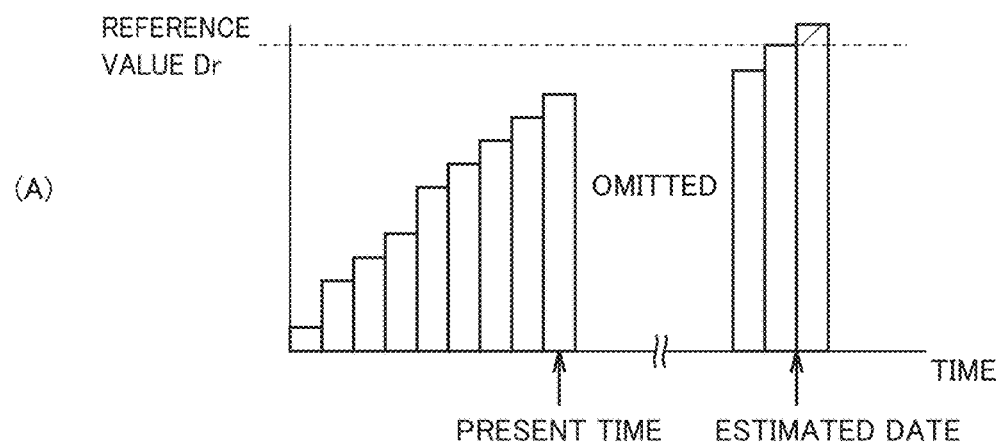
FIG. 8 illustrates results of prediction by a prediction unit 108 according to an embodiment.
Figure 8:
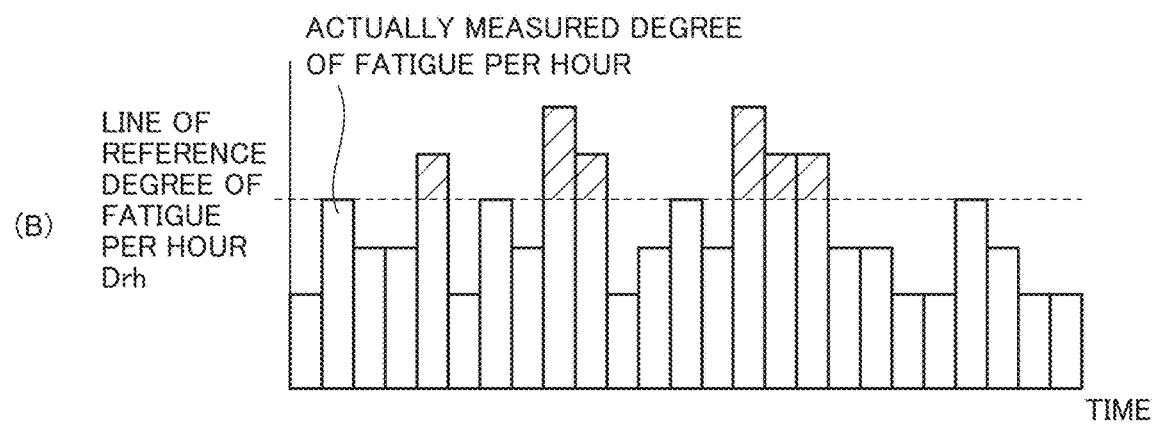

FIG. 8 illustrates a result of prediction by prediction unit 108 according to an embodiment.

FIG. 8 (A) shows the current cumulative degree of fatigue at the present time, as well as a reference cumulative degree of fatigue Dr serving as a reference value for fatigue fracture, and also shows the time period from the current cumulative degree of fatigue D to the estimated date at which the reference cumulative degree of fatigue Dr is reached. The reference cumulative degree of fatigue Dr calculated in advance through simulation or measurement of fatigue fracture may be used.

For example, prediction unit 108 can calculate the estimated date based on the current cumulative degree of fatigue D and the reference cumulative degree of fatigue Dr. Specifically, the average cumulative additive value per day is calculated from the current cumulative degree of fatigue and, based on the calculated average cumulative additive value, the number of days taken to reach the reference cumulative degree of fatigue Dr can be calculated.

The estimated date can be calculated to predict the lifetime of swing frame 30.

FIG. 8 (B) shows the degree of fatigue per hour.

As shown in FIG. 8 (B), a line of the per-hour reference degree of fatigue Drh may be determined from the reference cumulative degree of fatigue Dr to indicate the degree of fatigue per hour. This indication can also be used to propose, to an operator, a driving scheme that reduces the degree of fatigue of work machine 100.

In this way, the number of times the line of the reference degree of fatigue Drh is exceeded, for example, can be recognized.

When this number is large, prediction unit 108 can predict that the lifetime will expire earlier than the estimated date. In contrast, when this number is small, prediction unit 108 can predict that the lifetime will be extended beyond the estimated date.

According to the above description of the embodiment, controller 26 of work machine 100 has a configuration including axial-force measurement unit 104, evaluation unit 106, and prediction unit 108. The embodiment, however, is not limited to this configuration. For example, an evaluation system cooperating with a server provided communicatively with controller 26 may be configured. Specifically, the server may have a configuration including all of axial-force measurement unit 104, evaluation unit 106, and prediction unit 108, or including a part of these functions.

According to the above description of the embodiment, the degree of fatigue of the joint between the boom foot and swing frame 30 is evaluated. The embodiment, however, is not particularly limited to this, and the degree of fatigue of another part may similarly be evaluated. For example, the degree of fatigue of the joint between the arm foot of arm 7 and the boom top of boom 6, or the degree of fatigue of the joint between the arm top of arm 7 and the base end of bucket 8 may similarly be evaluated.

According to the above description of the embodiment, the axial force is the axial force of boom cylinder 10 serving as a hydraulic cylinder. The axial force, however, is not limited to the axial force of the hydraulic cylinder, and the axial force of an electrical cylinder can also be used. The axial force of the electrical cylinder can be calculated from the motor torque or the like.

According to the above description of the embodiment, a hydraulic excavator is illustrated as an example of the work machine. The work machine, however, is not limited to the hydraulic excavator, and the embodiment is also applicable to other types of the work machine such as crawler dozer and wheel loader.

While embodiments of the present disclosure have been described, it should be construed that the embodiments disclosed herein are given by way of illustration in all respects, not by way of limitation. It is intended that the scope of the present disclosure is defined by claims, and encompasses all modifications and variations equivalent in meaning and scope to the claims.

REFERENCE SIGNS LIST 1 vehicle body; 2 work implement; 3 swing body; 4 operator's cab; 4S operator's seat; 5 travel implement; 5Cr crawler belt; 6 boom; 7 arm; 8 bucket; 9 engine compartment; 10 boom cylinder; 11 arm cylinder; 12 bucket cylinder; 13 boom pin; 14 arm pin; 15 bucket pin; 19 handrail; 24 swing motor; 26 controller; 30 swing frame

The invention claimed is:

1. An evaluation system for a work machine, the evaluation system comprising:
a work implement;
a support unit for the work implement;
an operational unit for the work implement that is operatively supported by the support unit;
a cylinder that causes the work implement to move with respect to the support unit; and
a controller that calculates an axial force of the cylinder and evaluates a degree of fatigue of the support unit based on the axial force of the cylinder,
wherein the support unit includes:
a pair of longitudinal plates holding the operational unit between the longitudinal plates to support the operational unit; and
a bridge plate spanning between the longitudinal plates, and
wherein the longitudinal plates and the bridge plate are welded together.

2. The evaluation system for a work machine according to claim 1, wherein the operational unit is a boom.

3. The evaluation system for a work machine according to claim 1, wherein the cylinder is a hydraulic cylinder.

4. The evaluation system for a work machine according to claim 1, wherein the controller further predicts a lifetime based on the evaluated degree of fatigue of the support unit.

5. An evaluation method for a work machine including: a work implement; a support unit for the work implement; an operational unit for the work implement that is operatively supported by the support unit; and a cylinder that causes the work implement to move with respect to the support unit, wherein the support unit includes: i) a pair of longitudinal plates holding the operational unit between the longitudinal plates to support the operational unit; and ii) a bridge plate spanning between the longitudinal plates, wherein the longitudinal plates and the bridge plate are welded together, and wherein the evaluation method comprising:

detecting, via a bottom pressure detection sensor, a bottom pressure of the operational unit;

detecting, via a head pressure detection sensor, a head pressure of the operational unit;

calculating an axial force of the cylinder based on the detected bottom pressure of the operational unit and the detected head pressure of the operational unit; and evaluating a degree of fatigue of the support unit based on the calculated axial force of the cylinder.

6. The evaluation method for a work machine according to claim 5, further comprising:

proposing a driving scheme that reduces the degree of fatigue of the support unit based on the evaluated degree of feature of the support unit.

\* \* \* \* \*